Nov. 10, 1959 G. W. KELLY 2,911,680
ELECTRICALLY HEATED SPRUE BUSHING FOR
INJECTION MOLDING APPARATUS
Filed Sept. 11, 1957 2 Sheets-Sheet 1
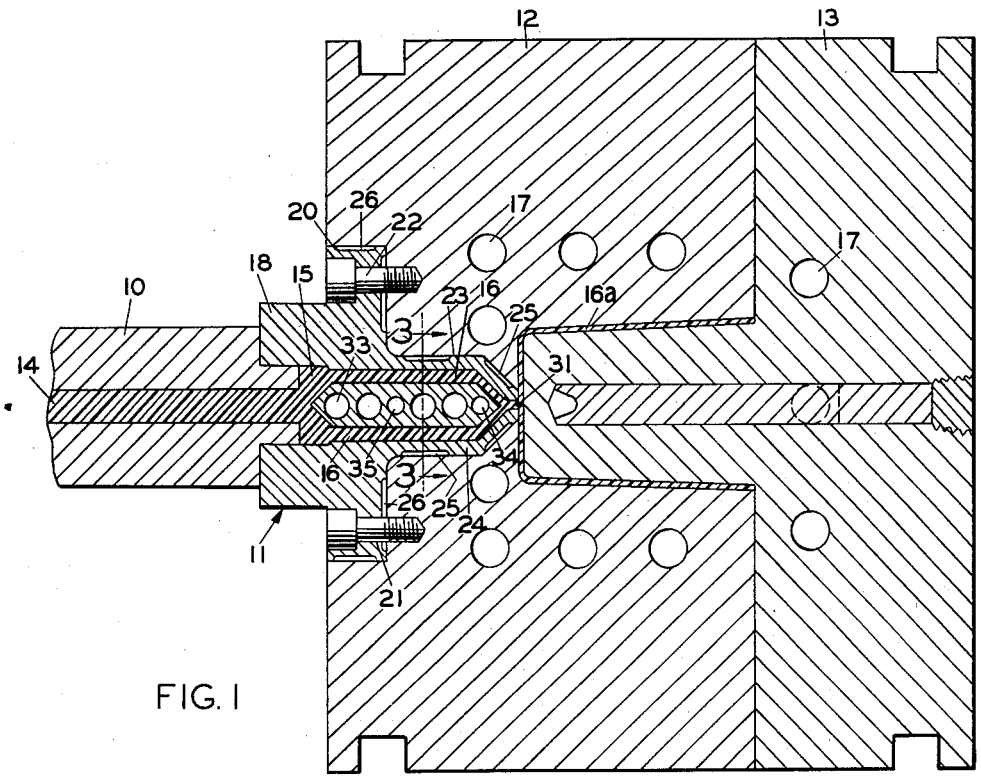
FIG. 1
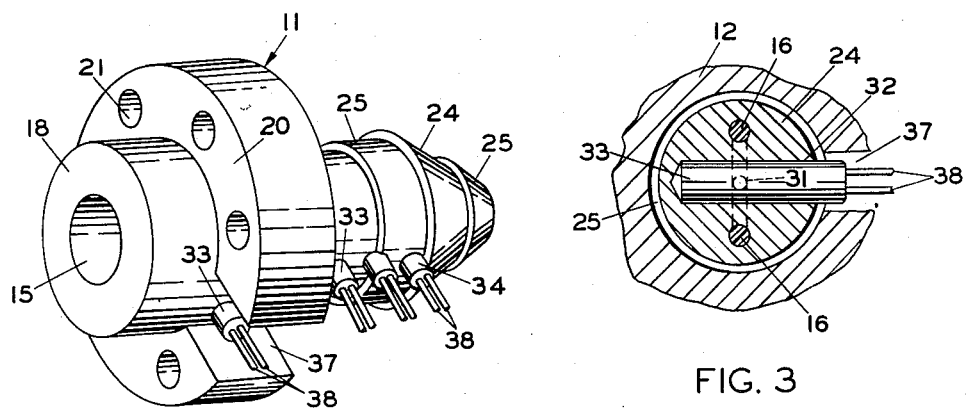
FIG. 2
FIG. 3
INVENTOR
GEORGE W. KELLY
BY
CORBETT, MAHONEY, MILLER & RAMBO, ATTY'S.
BY ATTORNEY Nov. 10, 1959  G. W. KELLY  2,911,680
ELECTRICALLY HEATED SPRUE BUSHING FOR
INJECTION MOLDING APPARATUS
Filed Sept. 11, 1957  2 Sheets-Sheet 2

INVENTOR
GEORGE W. KELLY
BY
CORBETT, MAHONEY, MILLER & RAMBO, ATTY'S.
BY  ATTORNEY



United States Patent Office 2,911,680
Patented Nov. 10, 1959

1

2,911,680

ELECTRICALLY HEATED SPRUE BUSHING FOR INJECTION MOLDING APPARATUS

George Walter Kelly, Columbus, Ohio, assignor to Columbus Plastic Products, Inc., Columbus, Ohio, a corporation of Ohio Application September 11, 1957, Serial No. 683,349

4 Claims. (Cl. 18—30)

This invention relates to molding apparatus and, more particularly, to molding apparatus of the injection type for use in the manufacture of molded articles composed of thermoplastic synthetic resins.

Such molding apparatus, as now ordinarily constructed for the manufacture of said articles, provides means by which the resins, while in a heated formative state, are advanced under pressure through communicating sprue passages to one or more cavities of a mold composed of partible sections and in which said articles are formed. Customarily, such molds comprise separable sprue, cavity and core sections held in closely adjoining relationship between stationary and movable platens of the apparatus. The sprue and cavity sections of the mold contain the sprue passages through which the heated plastic material is forced under ram-developed pressures into an article-molding cavity. After a given molding operation, in which the heated plastic material forced into the mold cavity is allowed to set, cure or harden to produce an article of a definite shape, the mold sections are separated to provide for the withdrawal of the molded article from the cavity of the cavity section and its removal as a formed product from the apparatus.

The sprue section of the molding apparatus commonly includes a sprue bushing which is ordinarily surrounded by the cavity section which is cooled by means of coolant passageways extending through the cavity section. This cooling of the cavity section is desirable to cause the article in the cavity to set, cure or harden promptly, but this cooling effect is ordinarily transmitted to the sprue passages in the bushing which is undesirable as it tends to cool the plastic material during its passage through the sprue passages and before it reaches the mold cavity. Obviously, it is desirable to keep the plastic material in the sprue passages at a given high temperature so that it will readily flow therethrough, under the ram pressure, into the mold cavity.

It is, therefore, the main object of this invention to provide electrical heating means in association with the sprue bushing of injection molding apparatus for maintaining the sprue passages therein, which lead to the mold cavity, at a relatively high temperature so that the plastic material will not tend to cure, set or harden within the sprue passage, but will readily flow, under pressure, into the mold cavity.

Another object of this invention is to provide an arrangement for heating a sprue bushing wherein the heating effect will be obtained directly adjacent the sprue passages and along such passages up to the point or points where they enter the mold cavity.

Still another object of this invention is to provide means for reducing the transmission of the effect of the cooling means, provided in the mold cavity section, to the sprue bushing.

Various other objects will be apparent.

With these and other objects in view, which will appear as the description proceeds, the invention consists in the novel features of construction, combinations of elements and arrangements of parts, all hereinafter more fully described and pointed out in the appended claims.

2

In the accompanying drawings, forming a part of this specification, and in which similar characters of reference denote like and corresponding parts throughout the several views thereof:

Figure 1 is a sectional view taken axially through an injection molding apparatus in which this invention is embodied.

Figure 2 is a perspective view of the present electrically heated sprue bushing.

Figure 3 is a transverse sectional view taken along line 3—3 of Figure 1 through the sprue bushing in which the invention is embodied.

Figure 4:
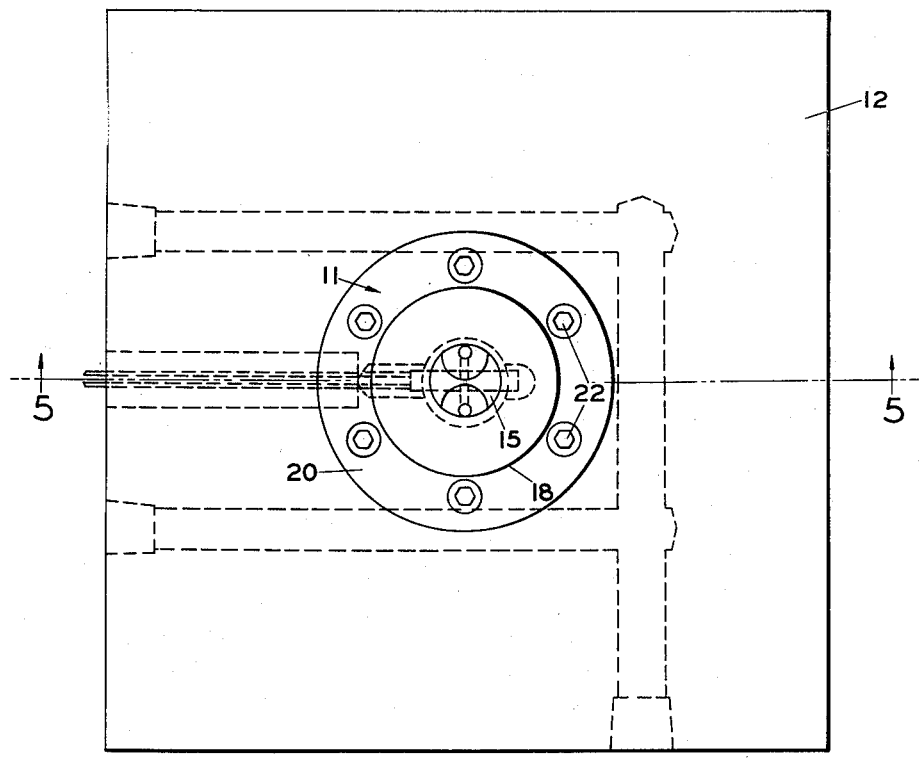
Figure 4 is a front elevational view of the cavity section of the injection molding apparatus, looking toward the outer end of the present sprue bushing.
Figure 5:
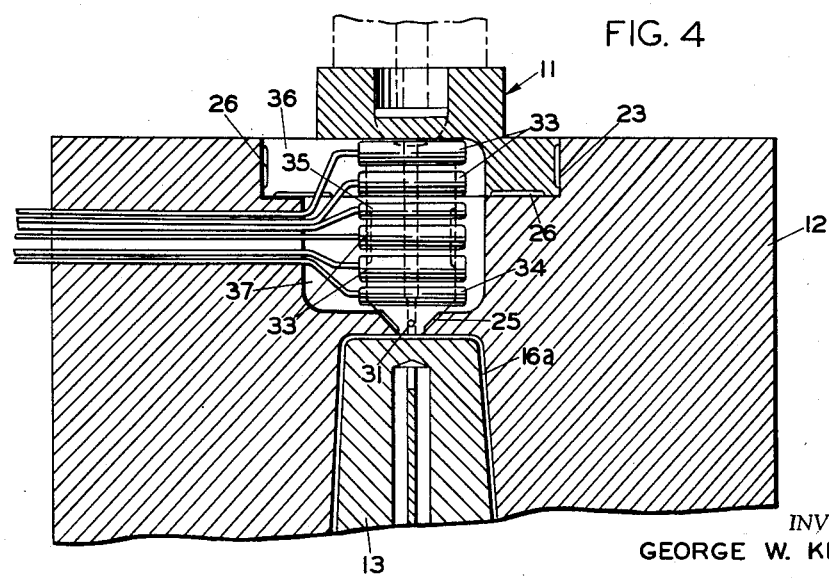
Figure 5 is a horizontal sectional view taken along line 5—5 of Figure 4.

The injection molding apparatus in which this invention is embodied is shown generally in the drawings and is adapted to be positioned on a suitable injection molding press. As shown, the apparatus includes an injection nozzle 10, a sprue bushing 11, a female or mold cavity die section 12, and a male or core section 13. The nozzle 10 is provided with a passage 14 through which plastic material, under pressure supplied by an associated injection ram, not shown, is supplied to the mouth 15 of the present sprue bushing 11. The mouth 15 of the bushing communicates with a pair of relatively spaced, axially extending branch passages 16 which converge with one another at the inner end of the bushing to form the single sprue outlet or gate 31 communicating directly with the molding chamber **16*a* defined between the die sections 12 and 13. As shown in Figure 1, the mouth 15 of the bushing 11 is formed to snugly, but removably, receive the reduced outer end of the injection nozzle 10 to provide a substantially fluid-tight connection therebetween. So that the article formed in the mold cavity 16*a* will cure, set or harden promptly, the die sections 12 and 13 are provided with fluid-conducting passages 17, for water or other cooling medium, which will provide a desirable cooling effect around and adjacent the cavity 16*a***.

In prior art arrangements, the cooling effect produced by the passages 17, especially in the mold section 12, was conducted directly to the sprue bushing 11. However, according to the present invention there is provided means for minimizing heat transfer between the die section 12 and the bushing 11 and for positively heating the sprue bushing to overcome any cooling effect and to maintain the sprue passages in the bushing effectively at a desired high temperature so as to prevent curing, setting or hardening of the plastic material in the sprue passages 16 of the bushing.

In the example of this invention shown in the drawings, the bushing 11 includes an annular mounting flange 20 which is provided with bolt openings 21, through which bolts 22 pass to secure the bushing within the bushing-receiving opening 23 in the die section 12. This flange 20 supports the inwardly extending nozzle portion 24 of the bushing and is concentric therewith. The flange 20 also supports the inlet sleeve portion 18 which receives the end of the injection nozzle 10. The outer surface of the nozzle portion 24 is provided with annular indentations 25 along most of its length which provide dead air insulating spaces to aid in minimizing heat transfer between the mold section 12 and the bushing 11. Similar indentations 26 are provided at the inner face and periphery of the flange 20 to provide dead air insulating spaces at these locations.

Between the sprue passages 16, the bushing is formed with a plurality of radially extending, longitudinally spaced chambers 32. The chambers 32 receive a series of diametrically extending electrical resistance-type heating elements 33 of cylindrical form. Provided directly adjacent the outlet sprue opening 31 is a thermocouple 34 of cylindrical form and intermediate the length of the bushing nozzle portion 24 is another thermocouple 35. These thermocouples 34 and 35 are employed to measure the temperature within the sprue bushing, in order that the heat in the bushing 11 may be regulated.

It will be apparent that with this heating arrangement for the sprue bushing 11, heat will be produced at the center of the nozzle and will be conducted radially outwardly to the passages 16. Thus, these passages and the plastic material passing therethrough can be maintained at a desired high temperature to insure against the cooling and hardening of plastic material prior to the time said material reaches the molding chamber 16a. Regardless of the tendency for the cooling medium in the mold section 12 to affect the temperature of the sprue passages 16, this will be overcome by the centrally disposed heating elements 33. Furthermore, as previously indicated, the tendency of the cooling medium to affect the sprue passages 15 is greatly minimized by the provision of the dead air spaces 25 and 26 between the adjacent surfaces of the mold section 12 and the bushing 11.

Although the heating elements 33 and associated thermocouples 34 and 35 may be positioned in the bushing 11 in various ways, it will be noted that the bushing flange 20 is provided with a notch or cut-out 36 to provide ready access to the heating element 33. The adjacent portion of the die section 12 may be recessed as at 37 to provide access for the lead wires 38 associated with the heating element 33 and the thermocouples 34 and 35.

It will be apparent from the above description that this invention provides means for maintaining the temperature of plastic material within the sprue bushing of an injection molding machine at a desirable high temperature to prevent curing, setting or hardening of the plastic until it actually reaches and enters the mold cavity. The temperature in the sprue passages will be maintained during all successive molding operations. The structure is very simple yet is very effective for the purpose for which it is provided.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In an injection molding machine, the combination with a die section having coolant-circulating passages therein and defining at least part of a molding chamber, of a sprue bushing positioned within a bore formed in said die section and communicating with the molding chamber defined at least in part by said die section, said sprue bushing being formed at one end thereof with an inlet to receive plastic material and terminating at its opposite end in a gate outlet communicating substantially directly with said molding chamber and formed intermediate the ends thereof with a plurality of separate, relatively spaced sprue passages connecting said inlet with said gate outlet; and means disposed within said sprue bushing between said sprue passages for heating and maintaining plastic materials passing through said sprue bushing in a flowable state.

2. The combination as defined in claim 1, wherein said sprue bushing is formed at spaced intervals with recesses defining a plurality of insulating spaces between said bushing and said die section.

3. In an injection molding machine; a normally chilled die section having a molding surface and a bore leading to said molding surface; a sprue bushing positioned in the bore of said die section, said bushing being formed with longitudinally extending passage means through which plastic materials may pass to the molding surface of said die section, said passage means including a plurality of relatively spaced sprue branches terminating in a single gate outlet communicating directly with and disposed in substantially flush relation to the molding surface of said die section; and electrically energizable heating means carried directly by said sprue bushing for heating and maintaining plastic materials passing through said passage means in a plasticized condition.

4. The combination defined in claim 3, wherein said sprue bushing and the walls of the bore of said die section define therebetween a plurality of dead air spaces.

References Cited in the file of this patent

UNITED STATES PATENTS

| | | |
|---|---|---|
| 2,227,966 | Emsley | Jan. 7, 1941 |
| 2,304,461 | Knowles | Dec. 8, 1942 |
| 2,585,204 | Wondra | Feb. 12, 1952 |